June 1, 1926.
W. E. WINE
TRACTOR SHOE
Filed April 15, 1925   2 Sheets-Sheet 1
1,586,928
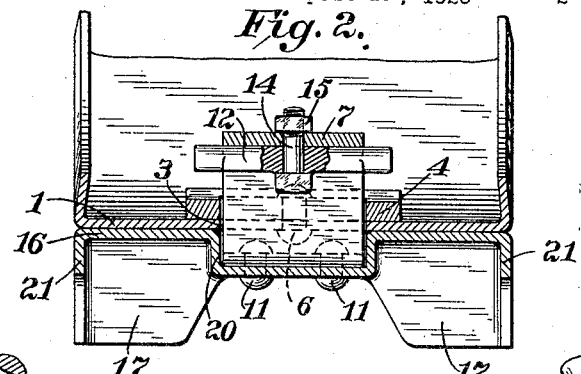
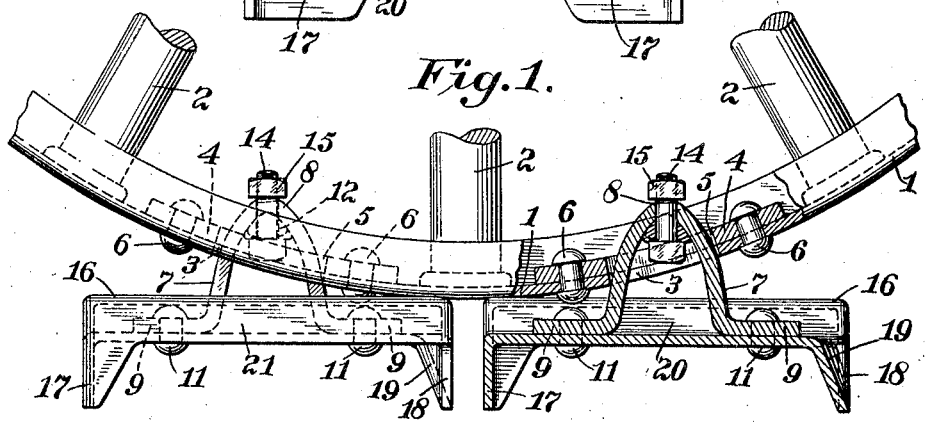
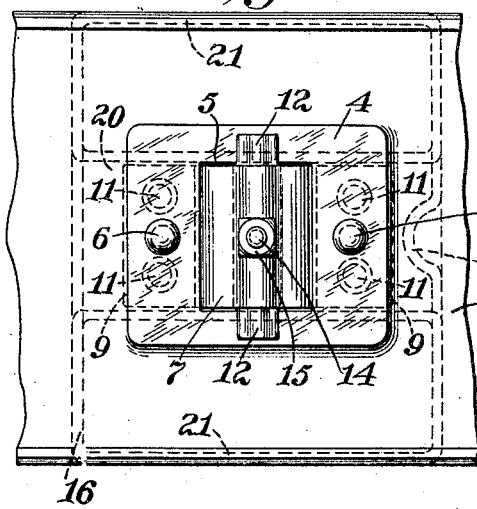
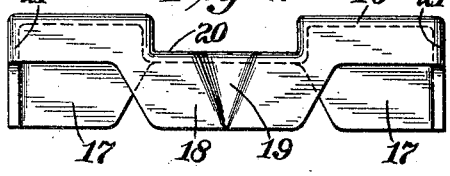
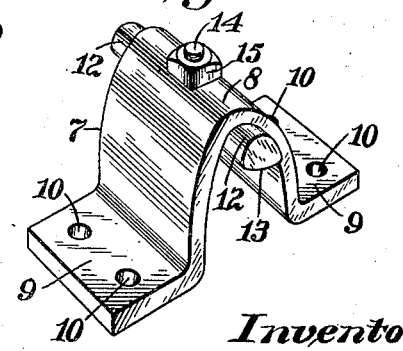
Inventor:
William E. Wine,
by Parker Cook
Atty.

June 1, 1926.

W. E. WINE

TRACTOR SHOE

Filed April 15, 1925

Inventor:
William E. Wine,
by Parker Cook.
Atty.

Patented June 1, 1926.

1,586,928

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR SHOE.

Application filed April 15, 1925. Serial No. 23,335.

My invention relates to new and useful improvements in tractor shoes, and the present application is a companion of an application filed by me on April 29, 1925, bearing Serial No. 26,697.

One of the objects of the present invention is to provide a tractor shoe, and I am now speaking of the device in its most comprehensive term, that is relatively light in weight, quickly and readily assembled, and relatively cheap to manufacture.

Another object of the invention is to provide a tractor shoe wherein the tread member comprises a metal frame which may be pressed on an 80 or 100 ton press, and to provide a channel extending longitudinally of the shoe in which are riveted the two feet of a retaining member, which retaining member is adapted to pass through an opening in the rim of a wheel; also to provide a cross bar fastened to the retaining member and positioned on the inner side of the rim to thus secure the tread member, but to allow the retaining means and tread member to rock or oscillate with reference to the rim.

In the companion application I provided a somewhat similar tread member and provided bearings to be placed on the outer surface of the rim so that the bearings would contact with the lower ends of the retaining means as the wheel revolves, but in the present instance, the rim of the wheel contacts with the upper surface of the shoes as the wheel revolves.

In the present invention the tread member is also shown in a modified form having a plurality of rubber feet or calks held therein so that under certain conditions this form of tread member may be used, or under other conditions the form of tread member may be used which is provided with integral and staggered teeth.

Still another object of the invention is to provide a tractor shoe which will be exceedingly economical in cost and construction, all of the parts with the exception of the cross bar being stamped from sheet or bar metal, and two of the parts then riveted, which forms an exceedingly durable, and at the same time, relatively cheap construction.

Still another object of the invention is to provide a tractor shoe which may be quickly and readily applied to the rim of a tractor wheel, regardless of its width, it simply being necessary to cut out a plurality of openings about the rim of the wheel and to rivet small reinforcing plates to the undersurface of the rim to provide reinforced bearing points for the cross bar of the retaining means.

With these and other objects in view, the invention consists in certain new and novel constructions and combination of parts as will be hereinafter more fully described and pointed out in the claims.

Referring now to the drawings, showing a preferred embodiment of the invention:—

Fig. 1 is a fragmentary side elevation of a wheel showing two of my shoes in their operable position, one of the shoes being shown in section and the other of the shoes being shown in elevation.

Fig. 2 is a cross sectional view of the wheel rim and a portion of the tread member, the tread member being shown in contact with the wheel rim and extending parallel with the rim.

Fig. 3 is an inner plan view of the attached shoe looking from within the rim.

Fig. 4 is an end view of the tread member.

Fig. 5 is a perspective of the retaining means.

Figure 7:
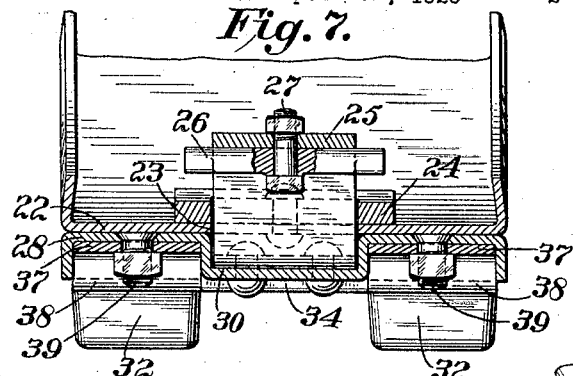
Fig. 7 is a view similar to Fig. 2 showing a modified form of tread member.
Figure 6:
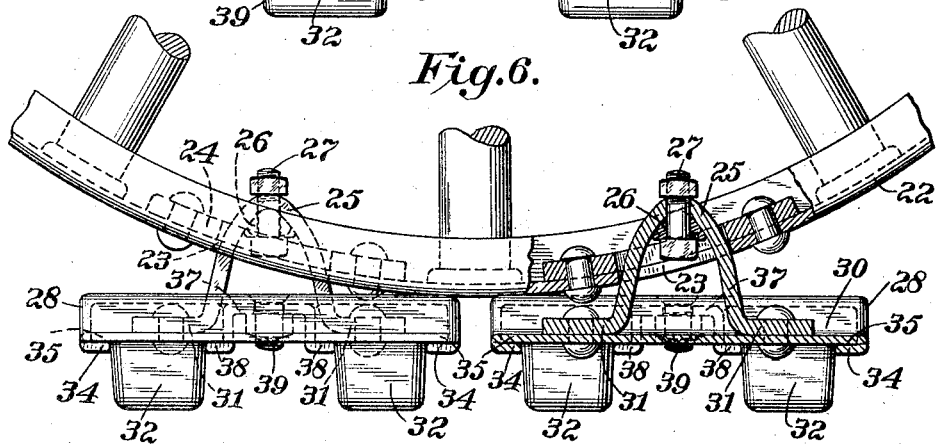
Fig. 6 is a view similar to Fig. 1 showing a modified form of tread member.

Referring now more in particular to the preferred form, there is fragmentarily shown a rim 1 of a wheel having the spokes 2, there being a plurality of openings 3 cut in the rim, and about these openings is riveted a plate 4 having the openings 5 registering with the opening 3, while rivets 6 are shown for tightly securing this plate to the wheel rim.

Adapted to extend within the opening in the rim and the opening in the plate 4, is a retaining member 7, which is preferably formed of sheet or bar steel and is substantially of inverted U-shape, the legs slightly rounding where they merge at the apex 8. The legs then extend outwardly at their ends forming the feet 9 which are provided with the holes 10 for the reception of rivets 11 to be shortly mentioned.

The curvature of the body of the retaining means is gradual, whereas in my former application the legs of the retaining means were more angularly positioned than in the present application.

The present curvature allows for a somewhat thicker cross bar 12, which bar is substantially triangular in shape, its sides being slightly rounded and the bottom surface 13 is also rounded so that it forms a rocking bearing on the upper edges of the side walls about the opening 5 in the plate 4. A bolt 14 passes through this cross bar 12 and is held in place by the nut 15. The entire contacting surface of the cross bar is a complement of the contacting surface of the retaining means so that the bar will be tightly fitted and tightly held within the retaining means and the ends of the bar, of course, extending outwardly beyond the sides of the retaining means.

Referring now to the tread member 16, it is preferably rectangular in shape, may be pressed from a blank in a large press and is so cut and bent that it will form the teeth 17 at its one end and the tooth 18 at its opposite end which tooth may have the bulged portion 19 therein to add strength to the tooth as a whole.

As may be clearly seen in Fig. 4, a channel 20 is pressed centrally and longitudinally of the shoe, while side rims 21 are provided, which merge with the several teeth. The entire tread member is a pressed article and may be manufactured at a relatively low cost after the dies have once been made. This tread member in its preferred form, is similar to the tread shown in my companion application above referred to.

As shown in the several views, the feet 9 of the retaining member 7 fit within the channel, lie flush with the lower surface of the channel and are held in position by the aforementioned rivets 11. After the retaining member is passed through the openings 3 and 5, the cross bar 12 will be bolted in place and the retaining means and tread member are thus secured to the wheel rim, but the tread and retaining means may oscillate or rock on the ends of the cross bar 12 as may be readily understood. The height of the retaining member is such that it may assume the position shown in Fig. 2, and it will be understood that there is no weight whatever on the cross bar when the shoes are in their lowermost position. The life of the cross bar is therefore greatly lengthened as the wear is only on this cross bar when the shoes are in a position other than when on the ground.

As far as the specification has proceeded, it will be seen that the two lower shoes, on a revolution of the wheel, will occupy the position shown in Fig. 1 and the rim of the wheel will bear on the adjacent ends of the two shoes, the rivets 6 extending within the channel 20 so that the contacting surface of the rim and the shoes will be a smooth or uninterrupted one. In my companion application, bearings were shown as attached to the outer rim which passed down within the channel and the present form is a somewhat cheaper construction.

Figure 8:
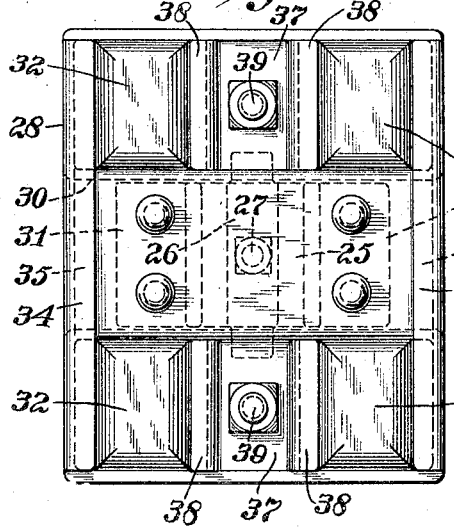
Fig. 8 is an outer plan view of the tread member showing the manner of retaining the calks in the tread member.
Figure 9:
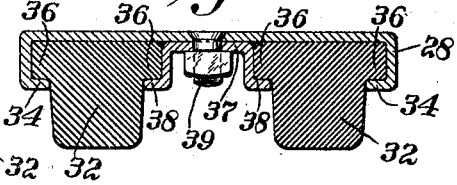
Fig. 9 is a cross sectional view of the tread member showing how the calks are held in place.
Figure 10:
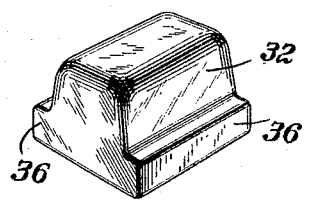
Fig. 10 is a perspective of one of the calks.

Referring now to the modified form of tread member and Figs. 7 to 10 inclusive, there is shown a rim 22 provided with the opening 23 and the plate 24 which is riveted to the rim, the retaining means 25, cross bar 26 and bolt 27, all of which are similar to the preferred form. The tread member 28, however, is slightly different in construction, it having the channel 30 in which the feet 31 on the retaining member 25 are secured and instead of having a plurality of teeth in staggered relation, there are shown the calks 32 held within the outer surface of the tread member. The opposite ends of the tread member 28 are provided with the short laterally inwardly extending flanges 34 and these will overlap the bottom of the channel as shown at 35.

The calks 32 are each provided with the opposite rims or flanges 36, one rim of each calk adapted to fit under one of the flanges 34 and two plates 37 are bolted centrally to the channel, which plates are also provided with the oppositely extending flanges 38 to engage respectively the adjacent flanges 36 of the calks 32. In other words, little retaining pockets are formed for the reception of these calks as the side flanges of the tread member and the channel section will contact with two of the ends of each calk, whereas the end flanges 34 and the flanges 38 on the little plates 37 will contact with the adjacent flanges 36 of the calk and thereby tightly retain the same in position.

Bolts 39 are shown for locking the little plates 37 to the tread member and it will be readily seen that as the calks wear or become damaged, it is a comparatively simple matter to remove one of these plates and insert a new calk 32 in position.

From the foregoing it will be seen that I have provided a very economical form of tractor shoe wherein the tread member may rock or oscillate with regard to the rim of the wheel, and wherein the tread member may be of one of two forms, either with the integral steel teeth, or as shown in the modified form, may be provided with a plurality of rubber calks which are securely held in place but at the same time may be quickly removed if damaged, and new ones substituted for them.

Many slight changes might be made without in any way departing from the spirit and scope of the invention.

Having thus described my invention, what I claim as new and desire to secure by Letters Patent is:—

1. A tractor shoe comprising a tread member rectangular in form and having rims at its opposite ends which extend inwardly, a centrally extending channel, calk members disposed on the opposite sides of the channel and respectively engaging the walls of said channel and engaging said aforementioned rims and removable plates disposed on the opposite sides of the channel for engaging the adjacent sides of said calks so that said calks are supported completely about their periphery, retaining means riveted to the tread member and disposed within said channel, and adapted to be secured to a wheel rim.

2. A tractor shoe comprising a tread member having a longitudinally extending channel, the end walls of said tread member having rims formed thereon and extending laterally inwardly, two calks disposed on each side of the channel and engaged respectively by the rims, side walls and channel walls, removable plates respectively disposed on the opposite sides of the channel for engaging respectively the fourth wall of each calk to thereby removably lock the said calk within the tread member.

3. A tractor shoe comprising a tread member having a longitudinally extending channel formed in the inner surface of the tread member and the end walls of said tread member being bent inwardly and overlapping the ends of said channel, a plurality of calks supported on the opposite sides of the said channel, two plates having outwardly and laterally extending feet removably secured to the outer surface of said tread member for engaging respectively one side of each calk member to thereby finally lock the said calks in position.

4. A tractor shoe comprising a tread member having a channel extending throughout the length of the tread member, a plurality of calks placed in the outer surface of the tread member, the calks and the tread member so arranged that the calks will be engaged on three sides by fixed portions of the tread member and removable means for engaging the fourth side of each calk to thereby finally lock all of the calks in position.

5. A tractor shoe comprising in part a tread member box-like in cross section and open at its tread side, a channel formed in the inner surface of the tread member, a retaining member having feet fitting within the channel and riveted thereto, rubber calks fitting upwardly within the tread member and engaging the undersurface of the side walls of said channel, rims on the end walls of said tread member for engaging said calks, said calks also contacting with the side walls of said tread member, and means locked to the outer surface of said tread member for finally locking the said calks in position.

In testimony whereof I affix my signature.

WILLIAM E. WINE.